(12) United States Patent
Tajima et al.

(10) Patent No.: US 6,426,393 B1
(45) Date of Patent: Jul. 30, 2002

(54) POLYACETAL COPOLYMER AND METHOD FOR PRODUCING THE SAME

(75) Inventors: Yoshihisa Tajima; Hidetoshi Okawa, both of Fuji (JP)

(73) Assignee: Polyplastics Co., Ltd. (JP)

( * ) Notice: Subject to any disclaimer, the term of this patent is extended or adjusted under 35 U.S.C. 154(b) by 0 days.

(21) Appl. No.: 09/762,064

(22) PCT Filed: Mar. 14, 2000

(86) PCT No.: PCT/JP00/01532

§ 371 (c)(1), (2), (4) Date: Feb. 1, 2001

(87) PCT Pub. No.: WO00/55227

PCT Pub. Date: Sep. 21, 2000

(30) Foreign Application Priority Data

Mar. 15, 1999 (JP) ............................................. 11-068703

(51) Int. Cl.[7] ............................................... C08L 61/02
(52) U.S. Cl. ........................ 525/398; 525/401; 525/402; 528/245; 528/246; 528/249
(58) Field of Search ................................ 525/398, 401, 525/402; 528/245, 246, 249

(56) References Cited

U.S. PATENT DOCUMENTS 5,929,195 A    7/1999   Kawaguchi et al.

FOREIGN PATENT DOCUMENTS

| JP | 2-214714 | 8/1990 |
| JP | 4-266917 | 9/1992 |

*Primary Examiner*—Duc Truong
(74) *Attorney, Agent, or Firm*—Nixon & Vanderhye P.C.

(57) ABSTRACT

To provide polyacetal which has excellent shock resistance, rigidity and creep resistance as essential properties of the polymer and makes a high flowability and an excellent molding property upon molding possible by improving the thermal stability. In the manufacture of a polyacetal copolymer by a copolymerization of 100 parts by weight of trioxane (a) with 0.05–20 parts by weight of a cyclic ether compound (b) which is copolymerizable with trioxane and 0.001–10 parts by weight of a mono-functional glycidyl compound (c), the mono-functional glycidyl compound (c) having a chlorine content of not more than 0.3% by weight is used.

6 Claims, No Drawings

POLYACETAL COPOLYMER AND METHOD FOR PRODUCING THE SAME

FIELD OF THE INVENTION

The present invention concerns a polyacetal copolymer which is excellent in thermal stability and also has shock resistance, rigidity and creep resistant property, and a method of manufacturing the same.

PRIOR ART

Since polyacetal resins are excellent in the balance for mechanical properties, chemical resistance, sliding property, etc. and easy to be fabricated, they are generally utilized, as typical engineering plastics mainly for electric and electronic parts, automobile parts and various other mechanical parts.

However, along with extending application ranges thereof in recent years, higher characteristics have tended to be demanded gradually. For instance, when polyacetal resins are used in thin-walled parts, they often require shock resistance, rigidity and creep resistant property in addition to high flowability and moldability.

However, it is very difficult to improve the properties such as shock resistance, rigidity and creep resistant property together with high flowability and moldability by the modification of a polyacetal resin to the polymer per se.

For example, a method of lowering the degree of polymerization of the polyacetal polymer for the improvement of the flowability and moldability often deteriorates properties such as shock resistance, rigidity and creep resistant property. On the other hand, even if the polymerization degree of the polyacetal polymer is increased, improvement for the shock resistance, rigidity and creep resistance property remains insufficient and the flowability and moldability are greatly deteriorated.

Further, while the flowability of the resin is improved by elevating the molding temperature, not only the essential properties of the polyacetal polymer do not change at all by this method, but also properties such as shock resistance, rigidity and creep resistance property are rather lowered due to the lowering of the molecular weight by the thermal decomposition of the resin or micro-voids formed in the molding products by gases evolved upon thermal decomposition of the resin.

As described above, it is very difficult to make the shock resistance, rigidity and creep resistant property compatible with the high flowability and moldability by the improvement of the polyacetal polymer per se, for which improvement has been demanded. If such polyacetal polymers are obtainable, compositions and application uses in wide ranges utilizing such properties can be expected.

DISCLOSURE OF THE INVENTION

In view of the foregoing situations, the present invention intends to provide a polyacetal polymer having excellent shock resistance, rigidity and creep resistant property as the essential properties of the polymer and enabling high flowability and excellent moldability during molding by the improvement of the thermal stability, as well as a manufacturing method thereof.

For attaining the foregoing object, the present inventors have made an earnest study and, as a result, accomplished the present invention based on the finding that a branched structure formed to a polymer skeleton of a polyacetal polymer by copolymerization with a mono-functional glycidyl compound and the amount of a chlorine compound contained in the mono-functional glycidyl compound used for copolymerization are a factor which is important for the solution of the subject.

That is, the present invention concerns a method of manufacturing a polyacetal copolymer by copolymerization of (a) 100 parts by weight of trioxane, (b) 0.05 to 20 parts by weight of a cyclic ether compound copolymerizable with trioxane and (c) 0.001 to 10 parts by weight of a mono-functional glycidyl compound, in which the mono-functional glycidyl compound (c) with a chlorine content of 0.3% by weight or less is used, as well as a polyacetal copolymer obtained thereby.

DETAILED DESCRIPTION OF THE INVENTION

As hereunder, the polyacetal copolymer of the present invention will be explained in detail.

First, trioxane (a) which is used in the present invention is a cyclic trimer of formaldehyde. Usually it is prepared by the reaction of an aqueous solution of formaldehyde in the presence of an acidic catalyst and is used after purifying by means of distillation or the like. It is preferred that trioxane used for the polymerization contains as little as possible of impurities such as water, methanol and formic acid.

Next, examples of the cyclic ether compound (b) which is used in the present invention copolymerizable with trioxane (a) include ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolane, ethylene glycol formal, propylene glycol formal, diethylene glycol formal, triethylene glycol formal, 1,4-butanediol formal, 1,5-pentanediol formal and 1,6-hexanediol formal. Among them, ethylene oxide and 1,3-dioxolane are preferred.

In the present invention, the copolymerization amount of the cyclic ether compound (b) is from 0.05 to 20 parts by weight, preferably, 0.1 to 15 parts by weight and, particularly preferably, 0.3 to 10 parts by weight based on 100 parts by weight of trioxane as the ingredient (a). If the cyclic ether compound (b) is insufficient, the polymerizing reaction becomes instable and the thermal stability of the resultant polyacetal copolymer is poor. On the other hand, if the ratio of copolymerization of the cyclic ether compound (b) is excessive, mechanical properties such as strength and rigidity are lowered.

Then, the mono-functional glycidyl compound of the ingredient (c) in the polyacetal copolymer according to the present invention is a collective term for organic compounds having one glycidyl group in the molecule and typical examples thereof include glycidol, glycidyl ether comprising an aliphatic alcohol or an aromatic alcohol or a (poly)alkylene glycol adduct thereof with glycidol, and glycidyl ester comprising an aliphatic carboxylic acid or aromatic carboxylic acid or (poly)alkylene glycol adduct thereof with glycidol. Specific examples are methyl glycidyl ether, ethyl glycidyl ether, butyl glycidyl ether, 2-ethylhexyl glycidyl ether, 2-methyloctyl glycidyl ether, phenyl glycidyl ether, p-tertiary-butylphenyl glycidyl ether, sec-butylphenyl glycidyl ether, n-butylphenyl glycidyl ether, phenylphenol glycidyl ether, cresyl glycidyl ether, dibromocresyl glycidyl ether, glycidyl acetate and glycidyl stearate.

The copolymerization amount of the mono-functional glycidyl compound as the ingredient (c) is from 0.001 to 10 parts by weight, preferably, 0.01 to 10 parts by weight and, particularly preferably, 0.1 to 5 parts by weight based on 100 parts by weight of trioxane as the ingredient (a). If the copolymerization amount of the ingredient (c) is less than the above amount, no improving effect for the shock resistance can be obtained, whereas if it becomes excessive, it result in a problem that mechanical properties such as strength and rigidity are deteriorated.

As the mono-functional glycidyl compound (c), it is preferred to use those having a molecular weight of 100 to 1000. If the molecular weight of the mono-functional glycidyl (C) compound is excessive, the branched chain of the polyacetal copolymer formed by copolymerization is made longer to possibly disturb the crystallinity of the resin to deteriorate the basic properties thereof, or give undesired effects on the shock resistant property aimed in the present invention. On the contrary, if the molecular weight of the ingredient (c) is insufficient, the effect to the shock resistant property aimed in the present invention is extremely reduced.

The present invention has a feature in using the mono-functional glycidyl compound (c) having a chlorine content of 0.3% by weight or less, and this enables to manufacture a polyacetal copolymer having excellent thermal stability and also shock resistant property. The chlorine content is preferably 0.1% by weight or less, particularly preferably, 0.05% by weight or less. There is no particular restriction on the lower limit of the chlorine content and it is preferred that the chlorine content is 0.001% by weight or more with an economical point of view in the manufacture of the mono-functional glycidyl compound (c).

The chlorine content of the mono-functional glycidyl compound (c) is the sum of chlorine present in a free state and chlorine present as the chloro compound. The main portion thereof is derived from the chlorine compound.

As the method of measuring the amount of chlorine contained in the mono-functional glycidyl compound (c), a method of decomposing the mono-functional glycidyl compound in an alkali solution and titrating the resultant free chlorine ions with an aqueous solution of silver nitrate is adopted in the present invention. The definition described above is according to the amount of chlorine measured by this method.

A method of obtaining the mono-functional glycidyl compound (c) satisfying the above definition for the content of chlorine, includes a generally applicable method of obtaining a mono-functional glycidyl compound having the chlorine content exceeding the definition, distillating the same and separating fractions satisfying the definition, a method of removing chlorine ingredients for purifying by an adsorbent such as activated carbon or zeolite, and a method of combining them for purification.

The polyacetal copolymer according to the present invention is obtained basically by bulk polymerization of trioxane (a), cyclic ether compound (b) and mono-functional glycidyl compound (c) of a specified property using a cation polymerization catalyst optionally with addition of an appropriate amount of a molecular weight controller.

In the present invention, for obtaining a polyacetal copolymer more excellent in the thermal stability and also excellent in the shock resistance, it is desirable that the constituent unit derived from the cyclic ether compound (b) and the mono-functional glycidyl compound (c) is uniformly dispersed in the molecular chain of the polyacetal copolymer. For this purpose, upon manufacture of the polyacetal copolymer by polymerization, a method of previously mixing the cyclic ether compound (b), the mono-functional glycidyl compound (c) and the catalyst uniformly and adding the same to molten trioxane (a) supplied separately to a polymerizing apparatus and polymerizing them, or a method of further mixing the uniform mixture with trioxane (a) and then supplying them to the polymerization apparatus for polymerization is effective. Particularly, the reaction rate of the glycidyl compound (c) is often lower than that of other ingredients (a) and (b) and previous mixing of the ingredient (c) and the catalyst is extremely effective. By previously mixing them into the state of homogeneous solution as described above makes the dispersed state of the branched structure derived from the glycidyl compound satisfactory to improve the properties such as shock resistance, as well as provide excellent thermal stability.

In the production of the polyacetal copolymer of the present invention comprising the above constituting components, there is no particular limitation for the polymerizer but known apparatuses may be used and any of a batch system, a continuous method, etc. may be applicable. It is preferred to keep the polymerization temperature at 65 to 135° C. Deactiviation after the polymerization is carried out by adding a basic compound or an aqueous solution thereof to a reaction product discharged from the polymerizer after the polymerization reaction or to a reaction product in the polymerizer.

Examples of the cationic polymerization catalyst used in the present invention include lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride, boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine, inorganic and organic acids such as perchloric acid, acetyl perchlorate, t-butyl perchlorate, hydroxyacetic acid, trichloroacetic acid, trifluoroacetic acid and p-toluene sulfonic acid, complex salt compounds such as triethyl oxonium tetrafluoroborate, triphenyl methyl hexafluoroantimonate, allyl diazonium hexafluorophosphate and allyl diazonium tetrafluoroborate, alkyl metal salts such as diethyl zinc, triethyl aluminum and diethyl aluminum chloride, heteropoly acid and isopoly acid. Among these compounds, boron trifluoride and boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine complex are preferable. Such a catalyst may be diluted with an organic solvent or the like-and then used.

The polyacetal copolymer of the present invention may further be used together with branched or crosslinking structure-formable chemical components. Examples of the branched or crosslinking structure-formable components include ethylene glycol diglycidyl ether, propylene glycol diglycidyl ether, 1,4-butandiol diglycidyl ether, hexamethylene glycol diglycidyl ether, resolcinol diglydicyl ether, bisphnol A diglycidyl ether, polyethylene glycol diglycidyl ether, polypropylene glycol diglycidyl ether, polybutylene glycol diglycidyl ether, glycerine and derivatives thereof, pentaerythritol and derivatives thereof.

As the molecular weight regulator, alkoxy-containing low molecular-weight acetal compounds such as methylal, methoxymethylal, dimethoxymethylal, trimethoxymethylal and oxymethylene di-n-butyl ether, alcohols such as methanol, ethanol and butanol, ester compounds, etc. are cited. Among them, the alkoxy-containing low molecular-weight acetal compounds are particularly preferred. The amount of these molecular weight regulator to be added is not particularly limited as far as the effect of the present invention is not deteriorated.

Examples of the basic compound for neutralizing and deactivating the polymerization catalyst include ammonia, amines such as triethyl amine, tributyl amine, triethanol amine and tributanol amine, hydroxide salts of alkali metal or alkaline earth metal, and other known deactivators of the catalyst. It is preferred that, after the polymerization, an aqueous solution thereof is added to the product without delay to conduct deactiviation. After such a polymerization and a deactivation, washing, separation/recovery of unreacted monomers, drying, etc. may be carried out by conventional methods, if necessary.

Furthermore, a stabilizing treatment by a known method such as decomposition and removal of unstable terminal parts or sequestering of unstable terminal by a stabilizing substance is carried out if necessary and various necessary stabilizers are compounded. With regard to a stabilizer used here, one or more of hindered phenol compounds, nitrogen-containing compounds, alkaline or alkaline earth metal hydroxides, inorganic salts, carboxylates, etc. may be exemplified. In addition, one or more of common additive(s) for thermoplastic resin such as coloring agent [e.g., dye and pigment], lubricant, nuclear agent, releasing agent, antistatic agent, surface-active agent, organic high-molecular material and inorganic or organic filler in a form of fiber, powder or plates may be further added, if necessary, so far as the present invention is not hindered.

The polymerization degree and the like of the polyacetal copolymer of the present invention are not particularly limited. The polymerization degree and the like can be controlled in accordance with the purpose of the product and molding means. When the polymer is to be molded, the melt index (MI) thereof, as determined at a temperature of 190° C. under a loading of 2.06 kg, is preferably from 1 to 100 g/10 min., more preferably from 2 to 90 g/10 min.

According to the method of the present invention, a polyacetal copolymer having both excellent thermal stability and shock resistance can be obtained.

EXAMPLES

The present invention is to be described concretely by way of examples but the present invention is not restricted to these examples. The method employed for the evaluation of the properties in the examples are as follows.

1) Chlorine Concentration 1 g of a mono-functional glycidyl compound is dissolved in an equi-amount solution of dioxane and a 3N NaOH alcohol solution and stirred at 80° C. for 2 hours. After cooling to room temperature, it was titrated with 0.01N $AgNO_3$. The mol number of chlorine is calculated based on the amount of titration and is multiplied with atomic weight of chlorine to calculate the weight of chlorine. The chlorine concentration indicates weight percentage of the chlorine weight calculated to the mono-functional glycidyl compound used for measurement.

2) Melt Index (MI)

For the polymer after a deactivating treatment (powdery granules), melt index measured at 190° C. (g/10 min) is shown. This was evaluated as a specified value to the molecular weight. That is, the molecular weight is higher as MI is lower. However, for preventing decomposition upon measurement, a certain stabilizer (Irganox 1010, Chiba Geigy Co. (0.5 wt %) and melamine (0.1 wt %)) were added and mixed thoroughly, and measured.

3) Alkali Decomposition Rate (Existent Amount of Instable Portion)

1 g of coarse polymer powder subjected to the deactivation treatment is poured into 100 ml of an aqueous 50% methanol solution containing 0.5% ammonia and heated in a sealed vessel at 180° C. for 45 min. Then, the amount of folmadehyde decomposed and leached into the liquid was quantitatively analyzed and it is indicated by % by weight based on the polymer.

4) Shock Resistance

Injection molding was conducted by Toshiba Molding Machine IS80 under the condition at a cylinder temperature of 190° C. and a die temperature of 80° C. and an Izod test was conducted according to ASTM D 256. The evaluation was conducted for the notched specimens.

Example 1

Using a continuous type mixing reactor comprising a barrel equipped with a jacket for passing heating (cooling) medium on the outside and having a cross sectional shape in which two circles were partially overlapped and rotational shafts with paddles, and while rotating the two rotational shafts with paddles at 150 rpm respectively, bulk polymerization was conducted by supplying trioxane continuously with addition and incorporation, as comonomers, of 2.8% by weight of 1,3-dioxolane and 0.5% by weight of butyl glycidyl ether at a chlorine concentration of 0.03% by weight, 40 ppm of a 1 wt % dibutyl ether solution of boron trifluoride dibutyl etherate to trioxane (converted as boron trifluorine) as the catalyst and 0.12% by weight of methylal as the molecular weight controller from the supply port at an end.

The reaction product discharged from a discharge port of the polymerization apparatus was rapidly passed through a pulverizer, added to an aqueous solution at 60 ° C. containing 0.05% by weight of triethylamine and, pulverized into particles and, simultaneously, the catalyst was deactivated. Then, a crude polyacetal resin was obtained after separation, washing and drying. Then, 0.3% by weight of pentaerythrityl-tetrakis[3[(3,5-di-tert-butyl-4-hydroxyphenyl) propionate] and 0.15 part by weight of melamine were added as a stabilizer to 100 parts by weight of the crude polyacetal resin, melt kneaded at 205° C. by a twin shaft extruder to remove instable portions and, simultaneously, obtain pellet-shaped polyacetal resin. The result of evaluation is shown in Table 1.

Examples 2–7

Bulk polymerization was conducted in the same manner as in Example 1 except for using the mono-functional glycidyl compound at the chlorine concentration shown in Table 1 instead of butyl glycidyl ether at a chlorine concentration of 0.03% by weight and, further, pellets of the polyacetal resin were prepared in the same manner as in Example 1. The result of evaluation is shown in Table 1.

Comparative Examples 1–4

Bulk polymerization was conducted in the same manner as in Example 1 except for using the mono-functional glycidyl compound at a chlorine concentration of 0.3% by weight or more shown in Table 1 instead of butyl glycidyl ether at a chlorine concentration of 0.03% by weight and, further, pellets of the polyacetal resin were prepared in the same manner as in Example 1. The result of evaluation is shown in Table 1.

TABLE 1

| | Polymerization catalyst | | Mono-functional glycidyl compound | | | Property of flake after deactivation | | Shock resistance |
| --- | --- | --- | --- | --- | --- | --- | --- | --- |
| | Kind | (ppm based on entire monomer) | Kind | Chlorine concentration (%) | Charged weight ratio (% based on entire monomer) | MI (g/10 min) | Alkali decomposition (%) | Izod impact shock (J/m) |
| Examples | | | | | | | | |
| 1 | Boron trifluoride [1] | 70 | Butyl glycidyl ether | 0.03 | 0.5 | 6.5 | 0.7 | 72 |
| 2 | Boron trifluoride [1] | 70 | Butyl glycidyl ether | 0.01 | 0.5 | 6.7 | 0.6 | 79 |
| 3 | Boron trifluoride [1] | 70 | Butyl glycidyl ether | 0.1 | 0.5 | 6.7 | 0.9 | 67 |
| 4 | Boron trifluoride [1] | 70 | 2-ethylhexyl glycidyl ether | 0.04 | 0.5 | 6.8 | 0.8 | 70 |
| 5 | Boron trifluoride [1] | 70 | 2-ethylhexyl glycidyl ether | 0.08 | 0.5 | 6.5 | 0.8 | 65 |
| 6 | Boron trifluoride [1] | 70 | Phenyl glycidyl ether | 0.04 | 0.5 | 8.4 | 0.8 | 52 |
| 7 | Boron trifluoride [1] | 70 | cresyl glycidyl ether | 0.08 | 0.5 | 9.8 | 1.1 | 48 |
| Com. Examples | | | | | | | | |
| 1 | Boron trifluoride [1] | 70 | Butyl glycidyl ether | 0.5 | 0.5 | 7.1 | 1.6 | 43 |
| 2 | Boron trifluoride [1] | 70 | 2-ethylhexyl glycidyl ether | 0.4 | 0.5 | 8.8 | 1.7 | 38 |
| 3 | Boron trifluoride [1] | 70 | Phenyl glycidyl ether | 0.6 | 0.5 | 9.6 | 1.8 | 33 |
| 4 | Boron trifluoride [1] | 70 | cresyl glycidyl ether | 0.5 | 0.5 | 10.3 | 2.2 | 25 |

Note)
[1] diethyl ether complex

What is claimed is:

1. A method of manufacturing a polyacetal copolymer having a branched structure, which method comprises copolymerizing (a) 100 parts by weight of trioxane with (b) 0.05–20 parts by weight of a cyclic ether compound copolymerizable with trioxane, and (c) 0.001–10 parts by weight of a mono-functional glycidyl compound having a chlorine content of 0.3% by weight or less.

2. The method according to claim 1 in which the cyclic ether compound (b) copolymerizable with trioxane is ethylene oxide or 1,3-dioxolane.

3. The method according to claim 1 in which the mono-functional glycidyl compound (c) is selected from the group consisting of glycidyl ether and glycidyl ester each having a molecular weight of 100–1,000.

4. A polyacetal copolymer which is obtained by the manufacturing method according to claim 1.

5. The method according to claim 1, in which the component (c) is an organic compound having one glycidyl group in the molecular.

6. The method according to claim 1, in which the chlorine content of the component (c) is 0.001–0.1% by weight.

* * * * *